INVENTOR
CARL B. NENNERFELT

BY Brown Jackson Boettcher & Dienner

ATTORNEY

Sept. 8, 1970 C. B. NENNERFELT 3,527,889

CONFERENCE COMMUNICATION SYSTEM

Filed March 1, 1967 5 Sheets-Sheet 2

INVENTOR
CARL B. NENNERFELT

BY Brown Jackson Boettcher & Dienner

ATTORNEY

Sept. 8, 1970 C. B. NENNERFELT 3,527,889

CONFERENCE COMMUNICATION SYSTEM

Filed March 1, 1967 5 Sheets-Sheet 3

INVENTOR
CARL B. NENNERFELT

BY Brown Jackson Boettcher & Dienner

ATTORNEY

Sept. 8, 1970 C. B. NENNERFELT 3,527,889

CONFERENCE COMMUNICATION SYSTEM

Filed March 1, 1967 5 Sheets-Sheet 4

INVENTOR
CARL B. NENNERFELT

BY Brown Jackson Boettcher & Dienner

ATTORNEY

INVENTOR
CARL B. NENNERFELT

BY Brown Jackson Boettcher & Dienner

ATTORNEY

United States Patent Office 3,527,889
Patented Sept. 8, 1970

3,527,889

CONFERENCE COMMUNICATION SYSTEM

Carl B. Nennerfelt, Galion, Ohio, assignor, by mesne assignments, to New North Electric Company, Galion, Ohio, a corporation of Ohio Filed Mar. 1, 1967, Ser. No. 619,773
Int. Cl. H04m 3/56
U.S. Cl. 179—1 14 Claims

ABSTRACT OF THE DISCLOSURE

Arrangement in a communication system for providing conference connection between three or more station instruments. The initiating conferee keys or dials the number of a second party to place the two parties in normal calling-called communication. Either party then flashes his hook-switch or dials "1" and, after recept of dial tone, keys or dials the number of a third conferee. The calling-called connection is released and the three parties are placed in communication via an idle group of three conference terminal circuits which are dedicated to a given one of a plurality of conference node amplifier circuits. Succeeding conferees may be added by any conferee flashing the hook-switch or dialing "1" followed by dialing the number of the desired party, further discrete conference terminal circuits of a second plurality which are common to all of the conference node amplifier circuits being provided for use with the same conference node amplifier circuit in adding further conferees to such call.

BACKGROUND OF THE INVENTION

Field of invention

The present invention relates to communication conference circuits (such as telephone conference circuits). See Class 179, Subclasses 18.01, 1, and 27.

Description of prior art

It is known in the art to provide conference arrangements in telephone systems for simultaneous use by three or more persons. In the earlier arrangements, the conference arrangements were manually set up by an operator. With advancement of the field, equipment was developed to automatically provide conference connections for the parties. According to one automatic system, known as the "meet me conference" arrangement, each conferee, by prior agreement, dials the same conference number at a predetermined time, and the equipment responsively sets up a conference call. According to another automatic system, the initiating conferee dials a conference number which results in a plurality of phones being rung, and upon answer, being connected into a conference connection.

According to yet another arrangement, known as a crossbar PBX system, the initiating conferee lifts his handset, and upon receiving a dial tone, dials a predetermined conference number to gain access to a conference circuit. After dialing a "1" via the conference circuit, the conferee gains access to a register and receives dial tone. The number of a second desired conferee is then dialled, and the equipment connects the second conferee to the conference circuit, the register being dismissed. If it is desired to include a third conferee in the connection the initial conferee must again dial a "1" to gain access to a fourth register, and thereafter the number of the third conferee is dialled.

According to another known automatic conference arrangement, normal two party calls as well as conference calls are set up via conference circuits which are selectively connected to one of a pool of conference node circuits, whereby all calls, including normal calls between two parties, are handled as conference calls.

SUMMARY OF INVENTION

The present invention provides a conference arrangement in which the regular calls between a first and second station are estabilshed in the normal switching mode, and conference calls are established via a plurality of conference terminal circuits and a plurality of conference node circuits which are used for conference purposes only. Each conference node circuit is permanently connected to three conference terminal circuits of a first plurality, the three connected conference terminal circuits being assigned exclusively to that conference node circuit.

If a conference call is established between three parties, the connection will include the three conference terminal circuits of said first plurality and the interconnected one of the conference node circuit. If a further conferee is to be added, any party in the connection may flash his hook-switch, and with the receipt of dial tone, may dial the number of a further conferee. In such event, control means will enable a set of gates to connect an available one of the conference terminal circuits of a second plurality to the conference node circuit and the conference terminal circuits for the first three conferees. Additional conferees are reached in like manner over additional conference circuits of the second plurality. In each of these connections, the conference circuits are connected in parallel via the conference node circuit.

With this arrangement, assuming six conference node circuits, each having three of the first plurality of conference terminal circuits connected thereto (a total of eighteen), and a second plurality of twelve conference terminal circuits, a single conference may be set up with a maximum of fifteen conferees, and the remaining conference circuits may be used to provide fixed connections having three conferees each. As another example, if the conference connections have the same number of conferees, there may be six conferences of five conferees each. The numerous variations in the pattern of distributions of thirty conference terminal circuits with the six conference node circuits will be appreciated from such disclosure.

BRIEF DESCRIPTION OF THE DRAWINGS

In the accompanying drawings, FIGS. 1–5, when placed in vertical alignment, comprise an illustrative system, wherein:

FIG. 5 also sets forth, in block form, the control circuitry for the system comprising a pulse generator, a processor, a line interrogation circuit, a space division gate control, and a time division gate control.

GENERAL DESCRIPTION

Figure 1:
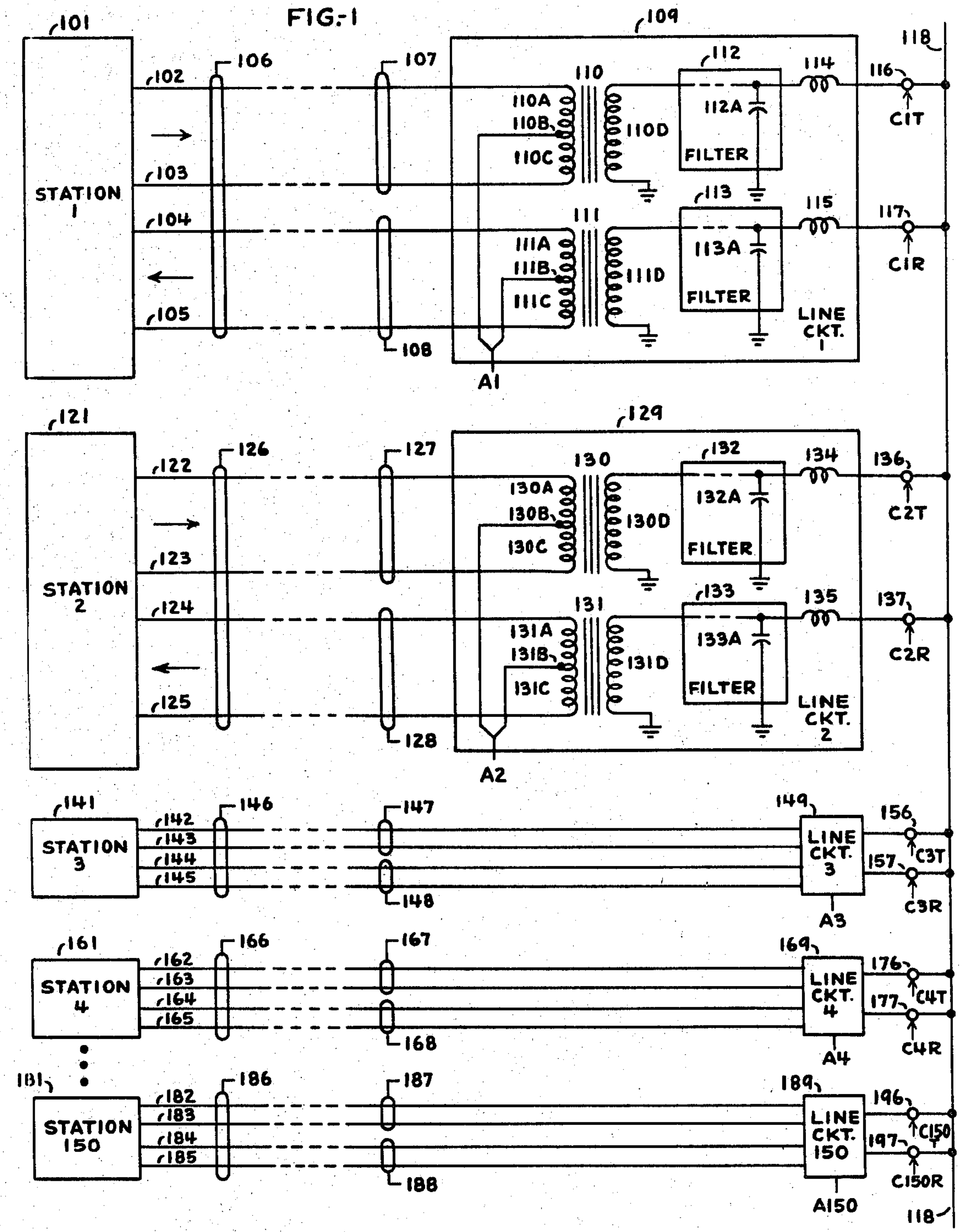
FIG. 1 is a diagram, partly in block form and partly in circuit form, of a plurality of four wire stations connected by means of line circuits and TDM gates to a single TDM highway.

The novel conference arrangement may be used with each of the different types of automatic telephone systems known in the field. However, for convenience of disclosure, the conference equipment is shown in a TDM switching system which includes pushbutton stations. When an initiating conferee at a station lifts his handset, a line interrogation unit in its routing operation detects a changed line condition, and signals a common control processor, which via the TDM system, connects the station of the initiating conferee to an idle register, the processor keeping track of the connection by means of a memory which stores the condition of the time slots and registers. With the receipt of dial tone, the initiating conferee keys the number of a desired conferee, the station equipment responsively transmitting dual frequency tones representing the called number into tone receivers in the register selected. The line interrogation unit in its routine operation canvasses the register, and relays the registered information to the processor which, via the TDM network, establishes communication between the stations of the initiating or calling conferee to the second conferee, and dismisses the register. It will be apparent that such procedures is conventional in setting up a normal call in a TDM system, and the system is not as yet informed that a conference connection is to be established.

After the called party has answered, either one of the two connected parties may flash his hook-switch (i.e., go on-hook for a predetermined interval, as for example, one or two seconds) to add a further conferee. The processor (via the line interrogation unit) interprets the on-hook signal as a request for a conference. The processor which keeps track of the condition of each conference terminal circuit and each conference node amplifier circuit, thereupon assigns a conference node amplifier circuit, if available, to the call; places the station of the particular party who did not flash his hook-switch on hold; and, via the TDM network, connects the station of the party who did flash his hook-switch to an idle register. If a conference node amplifier circuit is not available, the processor, via the TDM network, connects the station of the flashing conferee to a busy tone source. The conferee who attempted to add the third party may once more use the on-hook signal, and the processor will discontinue busy tone and establish the original connection.

Assuming dial tone is received, the flashing party keys the number of the third conferee into the register. The processor is appraised of the called number by the line interrogation unit, and places the conferee attempting to add the third party on hold, releases the register, via the TDM network, and rings the station of the third conference. If the same conferee flashes again, the processor, via the TDM network, reestablishes the original two-party connection. Assuming that the third conferee answers the call, the line interrogation unit signals the processor which via the TDM system connects the three conferees to the three conference terminal circuits which are connected to the assigned conference node amplifier circuit, and a three-party conference is established.

If any conferee wishes to call in an additional conferee, he signals by momentarily depressing his hook-switch. The line interrogation unit detects the signal and controls the processor to split the conference circuit, and to keep the parties, as well as the conference circuit, on hold.

The processor, via the TDM network, connects the flashing station to a register. Upon receipt of dial tone, the flashing party keys the number of the fourth conferee into the register which, via the line interrogation unit relays such information to the processor. The processor places the station of the party who flashed on hold, releases the register and, via the TDM network, rings the station of the desired fourth conferee. If the fourth conferee is busy, the processor, via the TDM network, connects busy tone to the station of the party who flashed. If such party flashes again, the processor, via the TDM network, reestablishes the original three-party conference. If the desired fourth conferee does not answer and the same party flashes again, the processor, via the TDM network, establishes the original three-party conference.

Assuming, however, that the desired fourth conferee answers, the processor is so informed via the line interrogation unit and, via the TDM system, connects each of the original three conferees to the hold conference terminal circuits. It will be recalled that the three conference terminal circuits of the first three parties are of the first plurality which are premanently connected to their own exclusive conference node amplifier circuit. At this time, the processor, via the TDM system, connects the fourth conferee to an idle conference terminal circuit of the second plurality, and via the space division system, operates gates, which connect this conference terminal circuit to the same conference node amplifier to which the three conference terminal circuits used by the first three conferees are connected. This procedure used in adding the fourth conferee can be repeated until a maximum of fifteen stations are connected in conference. In such event, the station of each conferee after the third will be connected to an additional conference terminal circuit of the second plurality, each additional station which is connected to the conference requiring the use of another conference terminal circuit of said second plurality.

If one of the conferees goes on hook, his connection is released, and another station can be called to replace him in the conference. When only two stations remain in a conference, the conference circuits are released, and a regular call between the two stations is established. Provision is also made for calling a distant station over a trunk into the conference, and for allowing a call from a trunk to control connection of further stations in a conference.

DESCRIPTION OF THE PREFERRED EMBODIMENT

The manner in which a regular local call is extended in the examplary TDM system is first set forth, and thereafter variations of the conference arrangements which may be provided are described.

Local call

Referring now to the upper left of FIG. 1, a block 101 representing a four wire, station designated station 1, is shown thereat. Such station may be a telephone which is connected by four wires, generally designated 106, to line circuit 1, designated 109, at a central office. Two wires 102 and 103 constitute the transmitting pair 107 and two wires 104 and 105 constitute the receiving pair 108. The transmitting and receiving pairs are terminated in the primary windings 110A, 110C and 111A, 111C of transformer 110 and 111 respectively. The midpoints of the primaries of transformers 110, 111 are connected over scanning point conductor A1 to the line interrogation circuit 515 (FIG. 5).

Secondary winding 110D of transformer 110 is connected via the filter 112, inductor 114, and a TDM gate 116 to TDM highway 118. Secondary winding 111D is connected via filter 113, inductor 115, and another TDM gate 117 to TDM highway 118. Gates 116 and 117 are connected over control conductors C1T and C1R respectively to time division gate control 517 in FIG. 5. Capacitor 112A of filter 112 and inductor 114 form part of a resonant transfer circuit in the transmitting branch for the first station, and capacitor 113A and inductor 115 form part of a resonant transfer circuit in the receiving branch for the first station.

When the party at station 1 lifts his handset, a direct current loop is established from station 1 over transmitting and receiving pairs 107 and 108 which via mid-points 110B and 111B of transformers 110 and 111 extends to scanning point A1.

Figure 2:
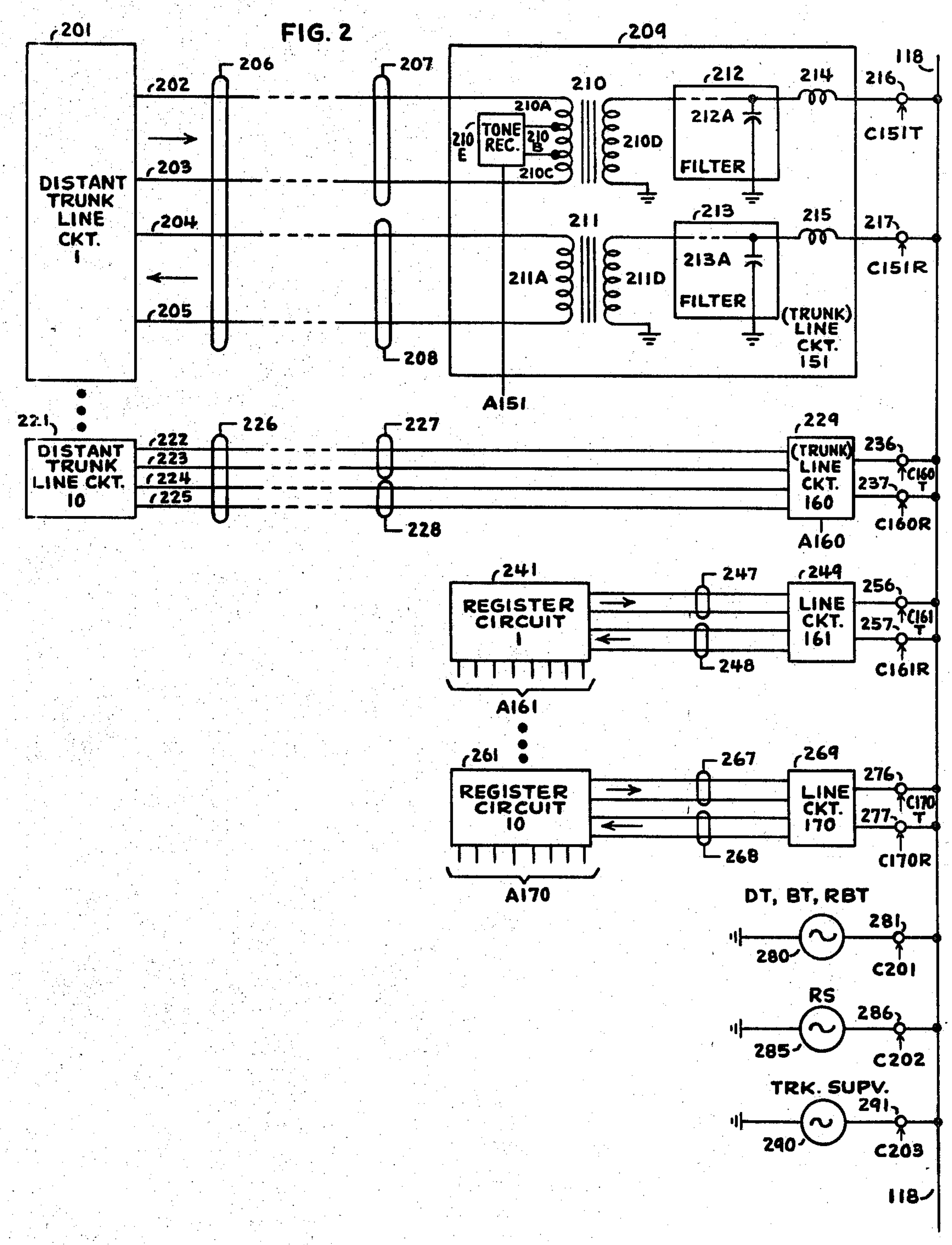
FIG. 2 is a diagram partly in block form and partly in circuit form of a plurality of trunks and a plurality of registers connected by means of line circuits and TDM gates to the same TDM highway, and further shows three signal sources connected by means of TDM gates to a TDM highway for the purpose of a signal injection.
Figure 5:
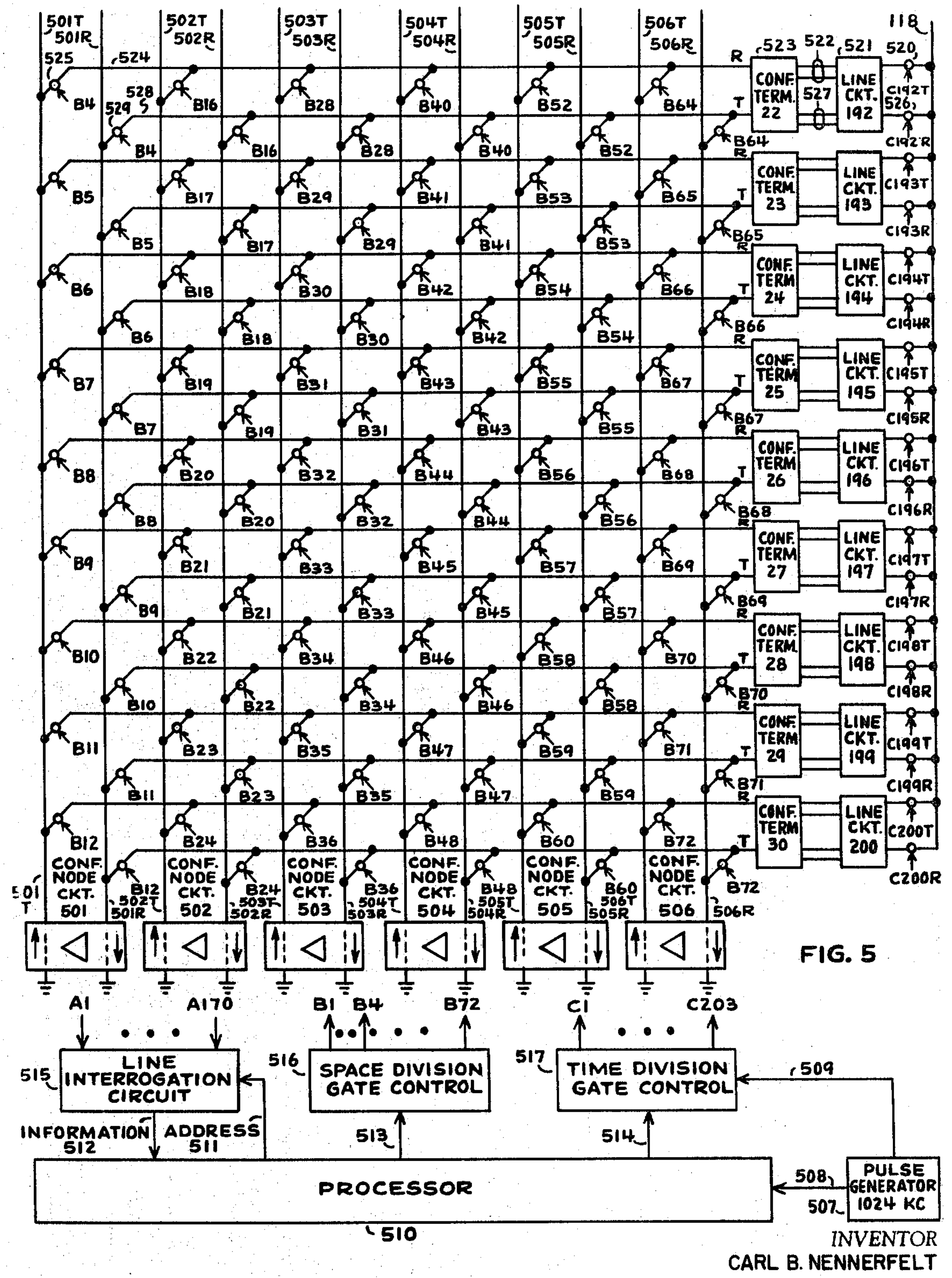

Referring to FIG. 5, the processor 510 via address cable 511 successively, as required, forwards addresses in binary word form to the line interrogation unit 515 which, in response thereto, selectively gates signals from scanning points A1–A170 of FIGS. 1 and 2, via 515 to the processor 510. Memory facilities in processor 510 maintains a memory of the previous states of the various scanning points. Thus, in its normal interrogation programmed routine, processor 510 is signalled that station 1 is calling.

Processor 510 keeps track of the idle and busy condition of each of the 128 time slots associated with highway 118, and of the idle and busy condition of the ten registers 241–261. At this time, processor 510 assigns idle time slots, which will be assumed, in the present example, to be time slots 1 and 2, and an idle register, such as register 241, to the calling station, and thereupon sends signals which may be in binary word form over path 514 to gate time division control circuit 517.

More specifically, the time division gate control 517 contains memory facilities, which by way of example, may be a core memory, word oriented, for storing bits of a binary coded word for each of the 128 time slots associated with highway 118, the stored bits identifying the gates which connect transmitting and receiving equipment to highway 118. Decoders actuated by these bits extend operating potentials to the various gates.

Accordingly, processor 510 via path 514 stores a code representing the address of gate 117 associated with the receiving branch of station 1, and a code representing the address of gate 281 associated with tone source 280 in the word memory for time slot 1; and stores a code representing the address of gate 116 associated with the transmitting branch of station 1 and a code representing the address of gate 257 associated with the receiving branch of the idle register circuit 241, for example, in the word memory for time slot 2.

As a result thereof, gate control 517 pulses leads C1R (FIG. 1) and C201 (FIG. 2) during time slot 1 of every frame, and at such time as leads C1R and C201 are energized, gates 117 and 281 will be conditioned for transmission. During each time slot 1 station 1 then receives dial tone over a resonant transfer path which is established from ground over tone source 280, gate 281, highway 118, gate 117, inductor 115, capacitor 113A in filter 113 to ground. The potential change on capacitor 113A causes a voltage change across primary 111D to effect current flow therein, and an induced secondary voltage in winding 111A, 111C causes a current flow via receiving pair conductors 104 and 105 to actuate the receiver of station 1. During time slot 2 of every frame, gate control 517 energizes conductors C1T and C161R and gates 116 and 257 operate to establish a TDM transmission path from station 1 to register 241.

The calling party at station 1, in response to hearing dial tone, keys the digits of the called number by successively depressing pushbuttons of station 1, each depression of a button resulting in a combination of two tones being sent over the transmit pair 107 to the central office during time slot 2. When the dual tones representing the first digit are received, current in primary 110A, 110C induces a voltage across secondary 110D which charges capacitor 112A. Since each of the two leads C1T and C161R are energized during time slot 2, the charge on capacitor 112A is transferred via inductor 114, gate 116, highway 118, gate 257 and an inductor in line circuit 249 to a capacitor in the filter thereof by the resonant transfer principle. As a result of receipt thereby of the two tones representing the first digit of the called number, register 241 conditions its scanning point A161 by energizing one of the first groups of its output leads comprising four conductors, and one of the second group of its output leads comprising four conductors.

When the processor 510 canvasses the scanning point A161 by means of the line interrogation circuit 515, signals on these leads from the register 241 via scanning point A161 pass via circuit 515 to the processor 510. As a result thereof, processor 510, via path 514, removes the word stored in the time slot 1 memory of gate control 517, which in turn removes its time slot 1 signals from conductors C1R and C201, whereby dial tone ceases in the receiver of station 1. The calling party continues keying the remaining digits of the called number into the register.

When all the digits of the called number have been received by the register and transferred to the processor 510 via line interrogation circuit 515, the processor via path 514 removes the information stored in the time slot 2 memory of gate control 517. We shall assume, for illustration purposes that the called number received was that of station 2 (FIG. 1).

If the called station 2 is busy, the processor selects an idle time slot, for example time slot 3, and, by means of gate control 517, pulses leads C1R and C201 to pulse gates 117 and 281 during time slot 3 of every frame to extend busy tone from the same source as dial tone, with the processor loading and unloading the time slot 3 memory of gate control 517 at intervals to produce busy tone. When the party at station 1 hangs up, the processor disrupts the busy tone connection.

Assuming that the called station 2 is idle, the processor selects two idle time slots assumed in the present example to be time slots 3 and 4, for ringing and ring-back purposes; stores the identity of gate 137 in the receiving path of station 2 and the identity of gate 286 associated with the ringing source in the time slot 3 memory of the gate control 517 for ringing purposes; and stores the identity of gate 117 in the receiving branch of station 1 and gate 281 in the ring back source in time slot 4 memory of gate control 517 for ring-back purposes.

Gate control 517 thereupon pulses gate 137 in the receiving path of station 2 over lead C2R, and gate 286 for the ringing source over lead C202 during time slot 3 of every frame to connect ringing tone to called station 2, the ringing source 285 controlling the ringing on-off periods. Gate control 517 also pulses gates 117 for station 1 and gate 281 for the ring-back source during time slot 4 of every frame to connect ring-back tone to station 1. The on-off timing of the tone to give ring-back tone is controlled by the processor which inserts information in, and removes information from, the time slot 4 memory of gate control 517 repeatedly.

If the party at station 2 does not answer, the processor, after a timed ringing period, disconnects ringing and ring-back and, as described above, effects the extension of busy tone to the calling station until the party thereat hangs up.

When the party at station 2 answers by removing the handset, station 2 establishes a direct current loop to scanning point A2, and the processor is signalled via the line interrogation circuit 515.

Thereupon the processor, via path 514, removes information pertaining to the call from time slot 3 and 4 memories in gate control 517 to terminate ringing and ringback tones; selects two idle time slots, which may be the same ones just used for ringing or different ones (time slots 4 and 5 will be assumed in this example); and via path 514 inserts the addresses of gate 116 for station 1 (transmitting path) and gate 137 for station 2 (receiving path) in the time slot 4 memory; and inserts the addresses of gates 136 and 117 in the time slot 5 memory. The transmitter of station 1 is thus placed in communication with the receiver of station 2 as gate control 517 pulses gates 116 and 137 during time slot 4 of every frame; and the transmitter of station 2 is placed in communication with the receiver of station 1 as gate control 517 pulses gates 136 and 117 during time slot 5 of every frame.

When either party replaces the handset, the direct current loop associated with the phone is opened, enabling the processor, via the line interrogation circuit, to be signalled. The processor, after a timed interval to determine whether a flash or hang-up has occurred, removes the information from time slot memories 4 and 5 of gate control 517 to terminate the connection.

Assuming that station 1 has its handset replaced and station 2 does not, station 2 receives busy tone, until hang-up, by gates 137 and 281 being pulsed during an assigned time slot (such as time slot 6) of every frame, in a timed application as controlled by the processor loading and unloading the memory of time slot 6 in gate control 517. When the party at station 2 replaces the handset, the processor ceases loading and unloading the memory of time slot 6 to discontinue busy tone.

It should be appreciated that the 1024 kc. pulse generator 507 supplies timing pulses to the time division gate control circuit 517 to provide synchronous operation of speech path contacts and to processor 510 in order to clock the processor logic.

Conference call

Two parties who are engaged in a normal two party call may decide that a conference call including one or more additional parties is necessary. Alternatively, a party may initially decide to set up a conference call. From an equipment standpoint, there is no difference, and the following description will be applicable to both.

It will be first assumed that the party at station 1, to be referred to hereafter as conferee 1, wishes to establish a conference with the parties at stations 2, 3, and 4, to be referred to hereafter as conferees 2, 3, and 4 respectively.

To initiate the conference, conferee 1 lifts his handset, receives dial tone, and keys the number of any one of the other conferees. Assuming conferee 1 dials the number of conferee 2, station 2 is rung as described hereinbefore under the heading "Local call," and station 1 receives ring-back tone. When conferee 2 answers, a regular local call is set up between conferees 1 and 2. It is assumed in this example that stations 1 and 2 are placed in communication by the pulsing of gates 116 and 137 in time slot 4, and the pulsing of gates 136 and 117 in time slot 5 also as described hereinbefore.

Although either conferee 1 or 2 may flash his hook-switch to initiate the inclusion of one of the further desired conferees 3, 4, it is assumed that conferee 1 flashes, receives dial tone, and keys the number of conferee 3. When conferee 1 flashes his hook-switch for an interval less than one or two seconds, the processor, via the line interrogation unit, interprets this as a request for conference and splits the connection (i.e., discontinues the pulsing of gates 116, 117, 136 and 137).

If a conference node amplifier circuit is not available, the processor, via gate control 517 pulses gates 117 (associated with station 1) and gate 281 to give busy tone to station 1. Conferee 1 may flash his hook-switch again, enabling the processor to discontinue busy tone and reestablish the original connection.

Assuming that a conference node amplifier circuit, such as circuit 501, is available, the processor assigns the node amplifier circuit 501 to the call; connects dial tone to station 1 by pulsing gates 281 and 117 in time slot 6, for example, and connects station 1 to an idle register, such as 241, by pulsing gates 257 and 116 in time slot 7, for example.

Upon receiving dial tone, conferee 1 keys the number of conferee 3, whereby dual tone bursts from station 1 are transmitted to register 241, the processor 510 being apprised of this number by the line interrogation unit 517 via scanning point A161. As a result of receipt of the first digit of the called number, processor 510, via gate control 517, discontinues the pulsing of gates 281 and 117, thus discontinuing dial tone. As a result of receipt of all the digits of the called number, the processor, via gate control 517, discontinues the pulsing of gates 116 and 257, thus disconnecting station 1 from register 241.

If the called station is busy, the processor extends busy tone to station 1, as would be understood from the previous description herein. Assuming that the called station is idle, the processor selects two idle time slots, 8 and 9, for example, and by means of gate control 517 pulses gates 157 for station 3 and gate 286 associated with the ringing source in time slot 8, for example, to ring station 3; and pulses gate 117 for station 1 and gate 281 associated with the ringback source RS to give ring-back tone to station 1.

If conferee 3 does not answer, the processor, after a timed ringing period, via gate control 517, discontinues the pulsing of gates 157, 286, 117, and 281, and as would be understood from the prior description herein, effects the extension of busy tone to conferee 1 by pulsing gates 281 and 117 in time slot 10, for example. If conferee 1 flashes again, the processor, discontinues the pulsing of gates 281 and 117 and reestablishes the original two-party connection by pulsing gates 116 and 137 in time slot 1 and gates 136 and 117 in time slot 2, for example.

Assuming, however, that conferee 3 answers by removing the handset of station 3, processor 510, via gate control 517 discontinues ringing and ring-back tone by discontinuing the pulsing of gates 157, 286, 117 and 281; and connects line circuits 109, 129, and 149 of stations 1, 2, and 3 respectively, via line circuits 301, 331, and 362 respectively to conference terminal circuits 316, 346, and 364 respectively, by pulsing gate 116 for station 1 and gate 309 for conference terminal 1 in time slot 1; gate 117 for station 1 and gate 308 for conference terminal 1 in time slot 2; gate 136 for station 2 and gate 339 for conference terminal 2 in time slot 3; gate 137 for station 2 and gate 338 for conference terminal 2 in time slot 4; gate 156 for station 3 and gate 366 for conference terminal 3 in time slot 5; and gate 157 for station 3 and gate 361 for conference terminal 3 in time slot 6, whereby a three-party conference is established.

When conferee 1 talks into the transmitter of station 1, variable voice current through the primary 110A–110C of transformer 110 induces variable voltage in secondary 110D which results in a variable charge on capacitor 112A. During the closely controlled intervals in which gate 116 for station 1 and gate 309 for conference terminal 1 are conditioned to conduct, the charge on capacitor 112A (as determined by the well known resonant transfer principle), is transferred to capacitor 305A over the path which extends from ground over capacitor 112A, inductor 114, gate 116, highway 118, gate 309 (FIG. 3), inductor 307 and capacitor 305A to ground.

The varying charge on capacitor 305A creates a varying current in primary 303D which induces a varying voltage across secondary 303A. This varying voltage is apparent in a circuit which can be traced from ground over lead 315, secondary 303A, lead 314 resistor 320 (which may be in the order of 10K), lead 322, lead 501R, and over the input circuit of the conference node amplifier circuit 501 (FIG. 5) to ground. This varying voltage is also apparent in a circuit which can be traced from ground over lead 315, secondary 303A, lead 314, resistor 319 (which may be in the order of 30K), and the input current of amplifier 317 to ground, the input being of a low impedance, as for example, 1–5 ohms.

Figure 3:
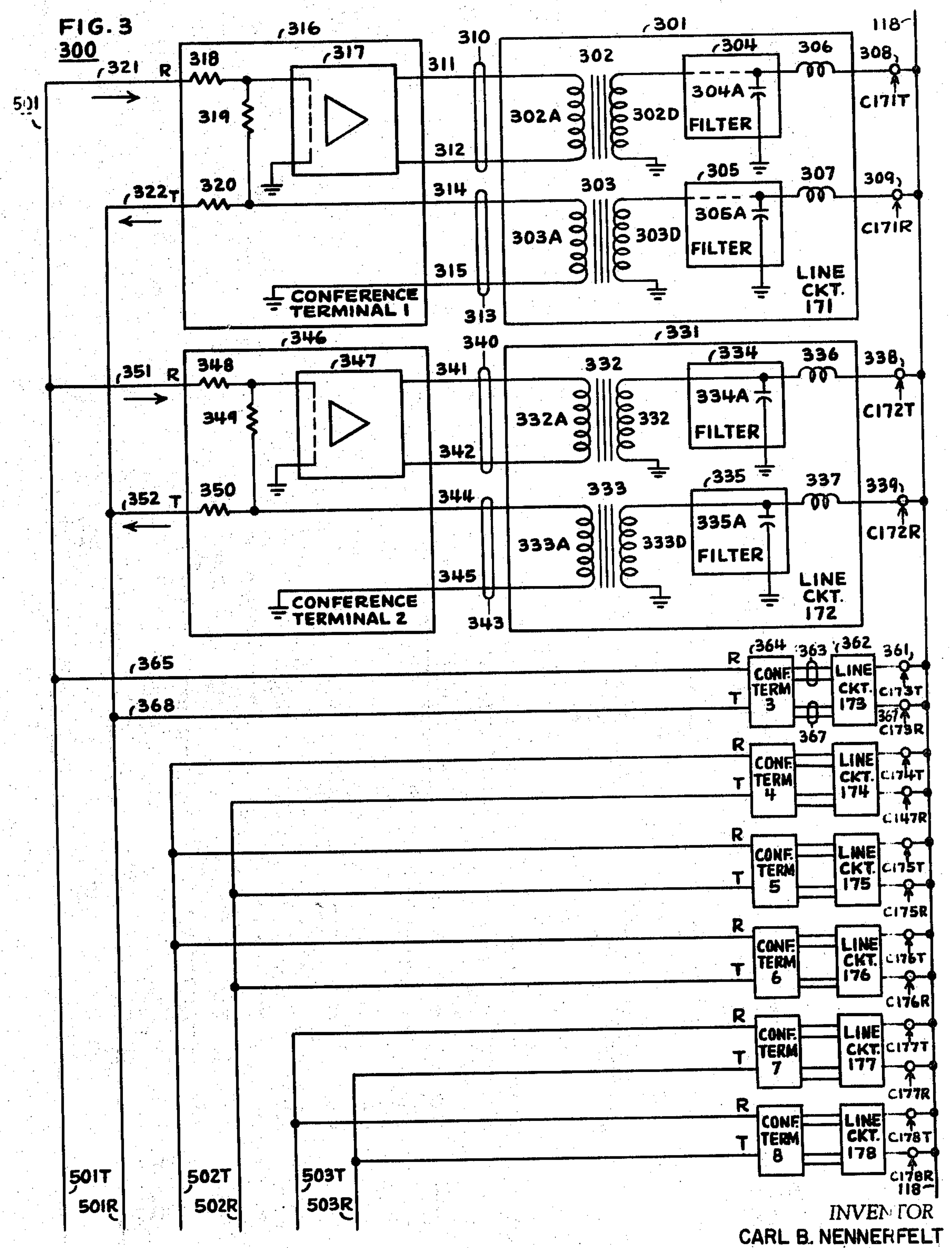
FIGS. 3–5 provide a diagram, partly in block form and partly in circuit and schematic form, of a plurality of conference terminals connected, by means of TDM gate circuits, to the same TDM highway. In the lower part of FIG. 5, six conference node amplifier circuits are shown which serve the conference circuits of FIGS. 3–5, as indiacted.
Figure 4:
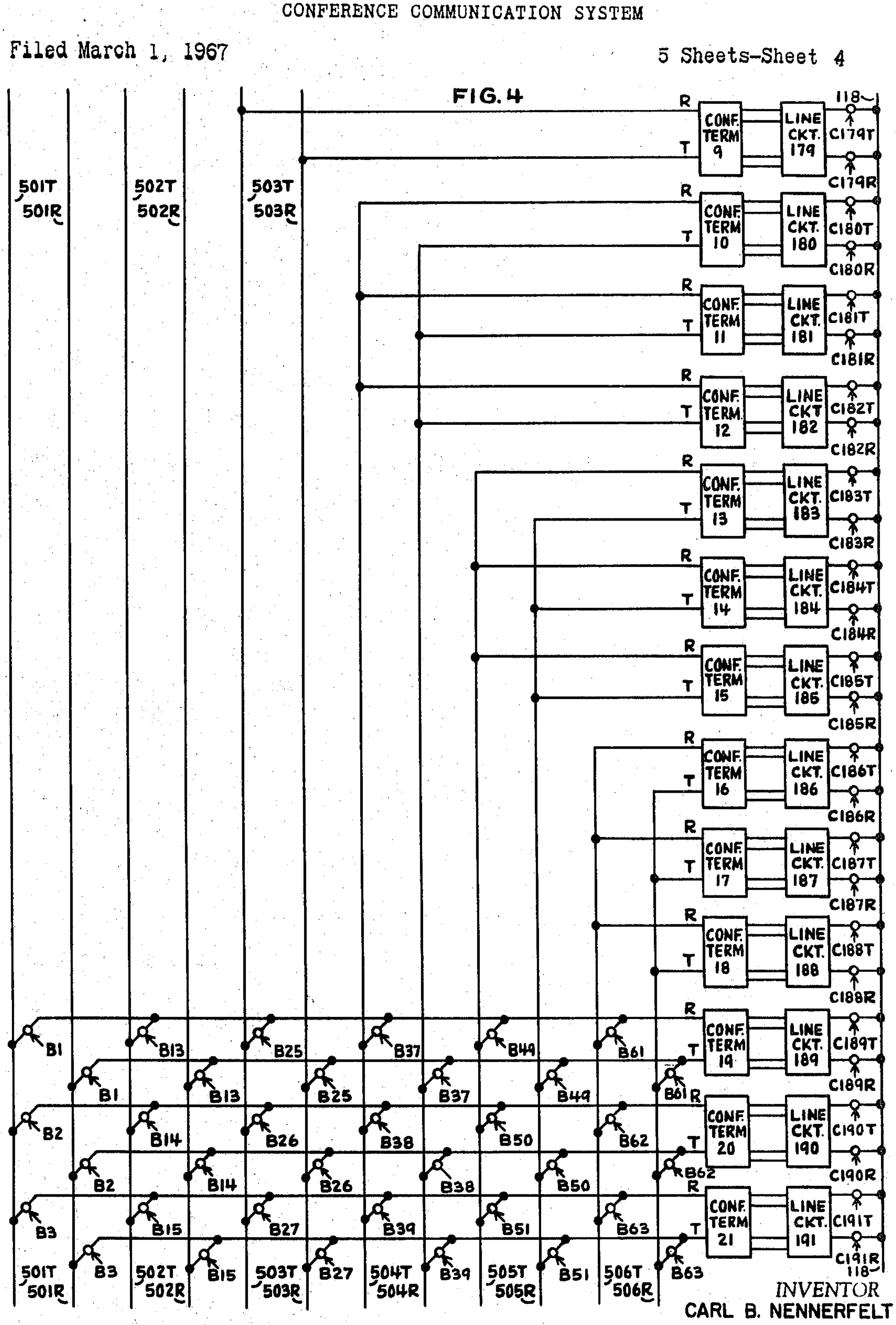

A circuit can also be traced from ground, through the output circuit of conference node amplifier circuit 501, lead 501T, through FIG. 4 into FIG. 3, lead 321, resistor 318 (which may be in the order of 30,000 ohms) and the input of amplifier 317 to ground, which input is of a low impedance, such as 1–5 ohms, by way of example.

The input and output impedances of the conference node amplifiers, such as 501, are extremely low, and the phase angle of the gain is 180°. This amplifier may include a low impedance input comprising a transistor connected in common base configuration, the output voltage of which is amplified and phase shifted 180° by a transistor whose emitter is grounded. The output of this transistor controls two current amplification stages comprising two transistors connected in emitter follower configuration, a connection from the emitter of the second transistor comprising the output lead. A negative feedback, which is a current feedback, is provided by a circuit comprising a resistor with a variable capacitor thereacross which is connected from the output to the input.

The conference terminal circuits 1–30 use the principle of outbalancing the side tone. Thus with reference to conference terminal circuit 1, by the proper selection of resistors 318 and 319, current through resistor 19 as a result of signals from one's own line can be made to be equal to the current through resistor 318 occasioned by one's own input. As the conference node amplifier 501 provides a phase shift of 180°, these two currents will be of opposite polarity and will cancel each other as far as the input signal to amplifier 317 is concerned.

A communication circuit for the second conference terminal 2 can be traced from ground, through the output circuit of conference node amplifier circuit 501, lead 501T, lead 351, resistor 348, and the input of amplifier 346 to ground, the values of corresponding resistances in all conference terminal circuits being the same. Assuming the party at station 1 is talking, and the party at station 2 is listening, there is no current through resistor 349 (i.e., the party at station 2 is listening) and current over resistor 348 to the input of amplifier 347 and ground will be effective.

The circuit for the third conference terminal circuit 364 (FIG. 3) can be traced from ground over the output circuit of conference node circuit 501, lead 501T, and lead 365 to conference circuit 364 and ground. With the party at station 1 talking and the party at station 2 listening, there is no cancellation current in the conference terminal circuit 364.

Thus, with conversation at station 1 there is no output from amplifier 317 but there is an amplified output from amplifier 347 of the second conference terminal 2, and an amplified output from the amplifier of the third conference terminal 364 as a result thereof.

The amplified output of amplifier 347 is in the form of a variable current through primary 332A in a balanced circuit comprising conductors 341 and 342. This variable primary current induces a corresponding variable voltage across secondary 332D which establishes a corresponding variable charge on capacitor 334A.

Each time gate 338 for conference terminal 2 and gate 137 for station 2 close, a resonant transfer occurs over the path which extends from ground over capacitor 334A, inductor 336, gate 338, highway 118, gate 137, inductor 135, and capacitor 133A to ground. This results in a corresponding variable current in primary 131D which, in turn, results in a corresponding variable voltage across secondary 131A–131C. This variable voltage is fed over conductors 124 and 125 as an input to station 2 to effect reproduction of the conversation from station 1 in the receiver of station 2.

In like manner, each time gate 361 for the third conference terminal circuit and gate 157 for station 3 close, a resonant transfer occurs between line circuit 362 and line circuit 149 resulting in the reproduction of the speech at station 1 in the receiver of station 3.

In a similar manner, speech signals originating at station 2 are sampled by the pulsing of gates 136 and 339 in the assigned time slots and fed to the input of conference node amplifier 501. The signals cancel out in the second conference terminal circuit 346, but are amplified in the first and third conference terminal circuits 316 and 364. As gates 308 and 117 are pulsed, the signals in the first conference terminal circuit 316 are transferred from line circuit 301 to line circuit 109 for station 1 resulting in the speech which is originating at station 2 being reproduced in the receiver of station 1. Also gates 361 and 157 are pulsed an assigned time slot, the signals in the third conference terminal circuit 364 are transferred from line circuit 362 to line circuit 149, resulting in the conversation originating at station 2 being reproduced in the receiver of station 3.

Similarly, with pulsing of gate 156 for station 3 and gate 366 for conference terminal circuit 3 in the assigned time slot, electrical signals provided as a result of conversation originating at station 3 arrive at the input of conference node amplifier 501 and cancel out in the third conference terminal circuit 364, and are amplified in first and second conference terminal circuits 316 and 346. As gate 308 for the first conference terminal circuit 1 and the gate 117 for the first station are pulsed, signals are transferred from the first conference circuit 1 and line circuit 301 to the line circuit 109, resulting in conversation originating at station 3 being reproduced in the receiver of station 1. Also, as gates 338 and 137 are pulsed, signals are transferred from the second conference terminal circuit and line circuit 331 to line circuit 129, resulting in conversation originating at station 3 being reproduced in the receiver of station 1.

It will be appreciated that signals originating at more than one of the stations 1, 2, and 3 may be amplified and shifted 180° simultaneously by the conference node amplifier, and also that each conference terminal circuit may amplify signals received from more than one station simultaneously.

In the foregoing example stations 1, 2 and 3 have been connected in conference. It is now assumed that the conferee at any one of the stations, such as for example conferee 2 at station 2, flashes his hook-switch for the purpose of connecting another conferee, such as the party at station 4, into the conference.

Processor 510, via line interrogation circuit 515, interprets the hook-switch flash as a request to include an additional conferee, and splits the conference by removing from the memories in gate control 517, the time slots in which gates 116, 117, 136, 137, 156, 157, 308, 309, 338, 339, 361, and 366 are being pulsed; retains stations 1, 2, and 3, conference node amplifier circuit 501 and connected conference circuits 1, 2, and 3 on hold; and reserves one of the conference terminal circuits 22–30, if idle, and its associated line circuit for the call. It is assumed, for illustration purposes, that the twenty-second conference terminal 523 and its associated line circuit 521 are so reserved.

Processor 510 then assigns two idle time slots, such as 5 and 9, and loads the time slot 5 memory in gate control 517 with the addresses of gate 281 for the dial tone source and gate 137 for station 2, and loads the time slot 9 memory in gate control 517 with the addresses of gate 136 for station 2 and gate 227 for register 261 which is assumed to be idle.

As station 2 receives dial tone, the party thereat keys the number of the station of the fourth conferee (station 4 in the present example). After all digits designating station 4 have been received by register 261 and have been transferred from register 261 to the processor via the line interrogation circuit 515, processor 510 discontinues the loading of the memories of time slots 5 and 9. Thereupon, processor 510 rings station 4 and gives ring-back tone to station 2 by effecting the pulsing of gate 283 for the ringing source and gate 177 for station four in an appropriate time slot; and gate 281 for the ring-back source and gate 137 for station two in a different appropriate time slot.

If station 4 is busy or does not answer within a predetermined interval, processor 510 disconnects ringing and ring-back tone and gives station 2 busy tone. Station 2 may then flash again, and the processor 510 will re-establish the original conference.

Assuming conferee 4 answers at station 4 by removing the handset thereat, processor 510, via the line interrogation circuit 517, discovers the same, and via gate control 517, disconnects ringing and ring-back signals.

Processor 510 further selects eight idle time slots, such as time slots 1–8, for example, and, via the gate control 517, pulses selected gates to establish a four party conference call.

Prior to describing the specific set of gates and circuits used in the exemplary call, it will be recalled that the system includes a first plurality of conference terminal circuits 1–18 and a plurality of conference node circuits 501–506 which are used for conference purposes only. Each conference node circuit, such as 501, is non-selectively connected to three conference terminal circuits, such as conference terminal circuits 1, 2, 3 which are assigned exclusively to the conference node circuit 501. Each of the other conference node circuits has a different set of three conference terminal circuits exclusively connected thereto.

A second plurality of conference terminal circuits 19–30 are arranged for selective connection to the same conference node circuits 501–506 by gates, such as 525 and 529, etc. If three parties are connected to a conference call, one conference node circuit, such as 501, and its three interconnected conference terminal circuits, such as 316, 346, 364, are used. However, if a fourth party is added, an idle one of the selected conference terminal circuits 19–30 is assigned for use by the additional party. Each additional party to the conference call requires the use of yet another one of the conference terminal circuits 19–30. The connection of these circuits to the node circuits 501–506 (and thereby the conference call) is achieved by a space division gate control 516 which signals over the appropriate leads B4–B72 to achieve such connections. In the present example since conference terminal circuit 22 has been assigned for use in connecting the fourth station to a connection which was established over conference node circuit 501 and its associated conference terminal 1–3, it is only necessary to signal over lead B4 to close gates 525 and 529 to establish the desired connection of the conference terminal 22 to the conference node circuit 501.

If a fifth party using conference terminal 26 were to be added to the connection, a signal on leads B8 would close the gates connected thereto. If alternatively, the conference node circuit 502 and its associated conference terminal gates 4–6 were being used, and conference terminal 22 was selected to include a fourth party, it is apparent that a signal on leads B16 would close the gates connected thereto. Other connections of the selective conference terminal circuits to be made for different conditions will be apparent therefrom.

Referring once more to the specific example in which the fourth party at station 4 is being connected to the three parties at stations 1–3 via conference node circuit 501, the following gates may be pulsed to establish such connection:

Gate 116 for station 1 and gate 309 for conference terminal circuit 1 in time slot 1.

Gate 117 for station 1 and gate 308 for conference terminal 1 in time slot 2.

Gate 136 for station 2 and gate gate 339 for conference terminal circuit 2 in time slot 3.

Gate 137 for station 2 and gate 338 for conference terminal circuit 2 in time slot 4.

Gate 156 for station 3 and gate 366 for conference terminal circuit 3 in time slot 5.

Gate 157 for station 3 and gate 361 for conference terminal circuit 3 in time slot 6.

Gate 176 for station 4 and gate 526 (FIG. 5) for conference terminal 22 in time slot 7.

Gate 177 for station 4 and gate 520 (FIG. 5) for conference terminal circuit 22 in time slot 8.

Gates 176, 526, 177, and 520 place station 4 in communication with line circuit 521 and conference circuit 523, as will be understood from the previous description.

The conference circuit 523 is connected to the conference node circuit 501 by the space division gate control 516. That is, signals extending over path 513 by processor 510 to space division gate control 516, are placed in a binary coded register which controls a decoder having seventy-two flip-flops, each of which may be set to energize one of the leads B1–B72 issuing therefrom. In the connection just described, processor 510, via path 513, identifies lead B4 to set the associated flip-flop, whereby gate control 516 energizes lead B4 and gates 525 and 529 establish conduction thereover. As a result, lead 528 from conference terminal 523 is connected to lead 501R leading to the input of conference node amplifier 501, and lead 524 from conference terminal 523 is connected to lead 501T for conference node amplifier circuit 501.

Signals resulting from speech originating at station 4 are thereupon directed, via conference terminal circuit 523 and conference node amplifier circuit 501 to the receivers of stations 1, 2, and 3, but are cancelled out in conference terminal 23 so that they do not affect the receiver of station 4; and signals as a result of speech originating at stations 1, 2, and 3 are directed to the receiver of station 4. A four-party conference has thus been established between stations 1, 2, 3, and 4.

If other conference terminal circuits are idle, other stations can be added to the conference so that up to and including fifteen stations can be included in the conference in the illustrated embodiment, the additional conference terminal circuits used being those of the group which are selectively connected to the node amplifier.

If another station, such as station 150, for example, initiates a conference while the conference between stations 1, 2, 3, and 4 is in progress, the second conference would be established using another conference node amplifier circuit, such as circuit 502, for example, and its associated conference terminals 4, 5, and 6. If more than three conferees are connected into this conference, available ones of the conference terminals 19–30 will be selectively connected to conference node amplifier circuit 502.

Assuming that the four-party conference circuit involving stations, 1, 2, 3, and 4 is in progress and that the conferee at station 1 replaces his handset, processor 510 via circuit 515 detects the same and via gate control 517 discontinues the pulsing of gates 116, 117, 308, and 309 whereby station 1 and conference terminal 1 and associated line circuit 301 are released. Conference terminal 1 is not available for use in another conference as the conference node circuit to which it is connected is still busy.

Assuming that conferee 3 then replaces the handset at station 3, processor 510 via circuit 515 detects the on-hook condition. With only two conferees remaining in conference, the processor 510 dissolves the conference, and establishes a regular two-party connection between conferees 2 and 4, thus making the conference terminal circuits and conference node amplifier available for use in another conference.

More specifically, processor 510 via gate control 517 effects the discontinuance of pulsing of gates 136, 137, 156, 157, 176, 177, 338, 339, 361, 366, 520 and 526; and via path 513 causes gate control 516 to reset the flip-flop which has been holding lead B4 energized, causing gates 525 and 529 to disconnect conference terminal 523 from conference node amplifier circuit 501. Conference terminal circuits 331, 364, and 523 and conference node amplifier circuits 501 are thereby made available for use in setting up conferences.

Processor 510 selects two idle time slots and via gate control 517 effects the pulsing of gates 136 and 177 in one of these time slots, and the pulsing of gates 176 and 137 in the other one of these time slots (time slots 10 and 11 by way of example). Stations 2 and 4 are thus placed in regular two-station connection.

The release of the two-station connection as now constituted will be understood from the previous description herein.

Conference over trunk

It is also possible with the illustrated equipment for a locally originated conference circuit involving stations 1 and 2 connected to conference circuits 1 and 2, for example, to include a conferee reached over a trunk circuit. After the processor 510 has received the number of the distant conferee via circuit 515, processor 510 by means of gate control 517 effects the pulsing of gates 291 and 217, for example, in a selected time slot to send bursts of tone from tone source 290 over the trunk and thereby enables the distant end to signal the distant conferee. After completion of pulsing over the trunk, processor 517 effects termination of the pulsing of gates 291 and 217. The distant processor, it will be understood, sends ring-back tone to the conferee who flashed.

Assuming station 1 flashed, station 1 will be connected to trunk 1, for example, by the pulsing of gates 116 and 217 in one time slot, and gates 117 and 216 in another time slot, whereby ring-back is provided to station 1. When the distant conferee answers, tone received in tone receiver 210E conditions scanning point A151, and processor 510 via circuit 515, detects such signal. Thereupon, processor 510, via gate control 517, effects the termination of the pulsing of gates 116, 117, 216, and 217 and, via circuit 517, connects trunk 206 to a conference circuit, such as 364, by pulsing contacts 216 and 366 in one time slot and contacts 217 and 361 in another time slot. The processor then reconnects stations 1 and 2 to conference circuits 1 and 2.

If desired, the distant conferee can flush his switchhook, and connect parties into the conference at the distant end. With use of key pulsing, the canvassing of points A1–A151 may be relatively slow; whereas the canvassing of points A161 to A170 must be relatively fast so as to acquire the desired information without losing portions thereof.

Dial pulsing

If dial pulsing is used at local stations, register equipment is not required, the dial pulsing being picked up over canvassing points A1–A150. Also dialing of a "1" may be used in place of flashing the hook-switch, such signal being picked up over the canvassing point as a request for conference. Scanning of points A1–A150 may be relatively slow until dial pulsing begins. Thereupon the scanning of any point upon which dial pulsing has begun must be relatively fast so that none of the pulsing information is lost. After pulsing has ceased, the canvassing points A1–A150 may revert to the relatively slower rate.

If a distant party's equipment uses dial pulsing, trunk signalling equipment at the distant end must convert the same to tone bursts.

While the present invention has been illustrated in a general system of the time division multiplex kind, it should be understood that it can be practiced in other commercial systems including division types, such as crossbar systems and the like.

What is claimed is:

1. In a communication system comprising a plurality of subscriber stations, a plurality of conference node amplifier circuits and a first plurality of conference terminal circuits for use in establishing conference connections between said subscriber stations, each conference node amplifier circuit having a different group of said first plurality of conference terminal circuits permanently connected thereto; a second plurality of conference terminal circuits which are common to said plurality of conference node amplifier circuits, and a switching network individual to said second plurality of conference terminal circuits comprising a plurality of switching means for each one of said conference terminal circuits of said second plurality, each switching means for a conference terminal circuit being connected to selectively connect its associated conference terminal circuit to a correspondingly different one of said plurality of conference node amplifier circuits.

2. A system as set forth in claim 1 in which each of said conference circuits includes means for outbalancing the side tone from the line of the station connected to the conference circuit.

3. A system as set forth in claim 1 in which each of said conference node amplifier circuit includes an input path, and in which the permanent connections to the conference node amplifier circuit include a permanent input path extending thereto from each conference terminal circuit of the group connected thereto, and in which a connection selectively made by one of said switching means from one of said second plurality of conference terminal circuits to a conference node amplifier circuit includes a path connected in parallel with said permanent input paths.

4. A system as set forth in claim 3 in which each of said conference node amplifier circuits includes an output path and in which the permanent connection for the conference node amplifier circuit includes a permanent path extending from said output path to each of the conference terminal circuits of its associated group, and in which a connection selectively made by one of said switching means from said conference node amplifier circuit to one of said second plurality of conference terminal circuits includes a path connected in parallel with said permanent output path.

5. A system as set forth in claim 1 which includes control means comprising first means for extending a connection between at least a first and a second station which includes at least a first and a second conference terminal circuit of said first plurality and a single one of said conference node amplifier circuits which is permanently connected to said first and second conference terminal circuits, and second means for controlling said switching network in the selective connection of a further station over a conference terminal circuit of said second plurality to said one conference node amplifier circuit and the conference terminal circuits of the first plurality which are permanently connected thereto.

6. A system as set forth in claim 5 which includes means in said control means which is responsive to restoration of the handset to the on-hook condition at all but a predetermined plurality of stations in said conference connection to release said conference node amplifier circuit, and to reestablish the connection for the remaining plurality of subscribers over said first means.

7. A system as set forth in claim 5 in which said first means comprises time division control means for connecting the stations to said first and second conference terminal circuit.

8. A system as set forth in claim 5 in which said second means comprises a space division control means for controlling said switching means in the connection of a further station to the connection over said one conference node amplifier circuit.

9. In a communication system comprising a plurality of subscriber lines, a plurality of conference node amplifier circuits and a first plurality of conference terminal circuits for use in establishing conference connections between said lines, each conference node amplifier circuit having a different group of said first plurality of conference terminal circuits permanently connected thereto; a second plurality of conference terminal circuits which are common to said plurality of conference node amplifier circuits, and control means including first switching means for selectively connecting a plurality of said lines in a conference call including a group of said first plurality of conference terminal circuits and the one of said conference node amplifier circuits which is permanently connected thereto and for connecting a further line to an idle one of said second plurality of conference terminal circuits, and second switching means for selectively connecting said one conference terminal circuit of said second plurality in said conference call which include only said one conference node amplifier circuit.

10. A system as set forth in claim 9 which includes trunk circuits for establishing calls to stations over associated trunks, and in which said control means includes means for connecting said stations accessed over said trunk circuits in a conference call with local ones of said stations.

11. A system as set forth in claim 9 in which said first switching means includes means for selectively interconnecting at least a first and a second line in response to transmission from said first line to said control means of the directory number of the second line, and in which said control means is responsive to transmission of a predetermined signal by one of said first and second lines to connect a third line with said first and second lines to a conference call including a first, second and third conference terminal of said first plurality and a single one of said conference node amplifier circuits.

12. A system as set forth in claim 11 in which said first switching means in said control means is responsive to the transmission of a further predetermined signal set by one of said first, second and third lines to said control means to connect only a fourth line to an idle one of said second plurality of conference circuits, and in which said control means controls said second switching means to selectively connect said one conference circuit of said second plurality of conference circuits to said single conference node amplifier circuits.

13. In a communication system comprising a plurality of stations, control means including a first switching means for selectively interconnecting said stations with one another in nonconference connections, a first plurality of conference terminal circuits, a second plurality of conference terminal circuits, a plurality of conference node amplifier circuits, means permanently connecting a different group of three dedicated conference terminal circuits of said first plurality to each node amplifier circuit, second switching means for selectively connecting each conference terminal circuit of said second plurality of any one of said conference node amplifier circuits, said first switching means being operative to selectively connect said stations to conference terminal circuits in said first and second plurality, and means in said control means operative to control said first and second switching means to connect at least three of said stations over conference terminals of said first plurality and at least one additional station over a conference terminal circuit of said second plurality in a conference connection including a single common node amplifier circuit.

14. In a communication system comprising a plurality of subscriber lines, a plurality of conference node amplifier circuits, and a first plurality of conference terminal circuits for use in establishing conference connections between said lines, each conference node amplifier circuit having a different group of said first plurality of conference terminal circuits permanently connected thereto; a second plurality of conference terminal circuits which are common to said plurality of conference node amplifier circuits, each conference terminal circuit having means for connecting only one line to a conference connection, and a switching network comprising a plurality of groups of switching means individual to said second plurality of conference terminal circuits, each group of switching means being connected individually to a different one of said conference terminal circuits of said second plurality, and each switching means in a group being selectively operative to connect its associated conference terminal circuit to a correspondingly different one of said plurality of conference node amplifier circuits.

References Cited

UNITED STATES PATENTS

| | | |
|---|---|---|
| 3,133,994 | 5/1964 | Zarouni. |
| 3,210,476 | 10/1965 | Shaer. |
| 3,293,369 | 12/1966 | Schroeder. |
| 3,331,924 | 7/1967 | Reaves. |
| 3,399,275 | 8/1968 | Niertit et al. |

KATHLEEN H. CLAFFY, Primary Examiner
C. JIRAUCH, Assistant Examiner

U.S. Cl. X.R.

179—18

PO-1050
(5/69)

UNITED STATES PATENT OFFICE
CERTIFICATE OF CORRECTION

Patent No. 3,527,889 Dated September 8, 1970

Inventor(s) Carl B. Nennerfelt

It is certified that error appears in the above-identified patent and that said Letters Patent are hereby corrected as shown below:

Column 1, the second line after the title should read:

"signments, to North Electric Company, Galion"

SIGNED AND SEALED [illegible]

(SEAL)
Attest:

Edward M. Fletcher, Jr.
Attesting Officer

WILLIAM E. SCHUYLER, JR.
Commissioner of Patents